United States Patent
Yoshino

(10) Patent No.: US 10,845,190 B2
(45) Date of Patent: Nov. 24, 2020

(54) MEASUREMENT APPARATUS FOR MEASURING HEIGHT OR SHAPE OF A SURFACE OF A MATERIAL

(71) Applicant: TOSHIBA MEMORY CORPORATION, Tokyo (JP)

(72) Inventor: Kiminori Yoshino, Kuwana Mie (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 108 days.

(21) Appl. No.: 16/114,011

(22) Filed: Aug. 27, 2018

(65) Prior Publication Data

US 2019/0271541 A1    Sep. 5, 2019

(30) Foreign Application Priority Data

Mar. 5, 2018   (JP) .................................. 2018-038860

(51) Int. Cl.
| | |
|---|---|
| *G11B 11/24* | (2006.01) |
| *G01B 9/02* | (2006.01) |
| *G01B 11/02* | (2006.01) |
| *G01M 11/02* | (2006.01) |
| *G01B 11/24* | (2006.01) |

(52) U.S. Cl.
CPC ........ *G01B 11/2441* (2013.01); *G01B 9/0209* (2013.01); *G01B 9/02038* (2013.01); *G01B 9/02063* (2013.01); *G01B 9/02085* (2013.01); *G01B 11/02* (2013.01); *G01M 11/025* (2013.01); *G01M 11/0271* (2013.01)

(58) Field of Classification Search
CPC ............ G01B 9/02063; G01B 9/02067; G01B 9/0209; G01B 11/0608; G01B 11/2441; G01M 11/025; G01M 11/0271
See application file for complete search history.

(56) References Cited

U.S. PATENT DOCUMENTS

| | | | | |
|---|---|---|---|---|
| 4,639,139 A | * | 1/1987 | Wyant ................ | G01B 11/2441 356/497 |
| 5,402,234 A | * | 3/1995 | Deck ........................ | G01B 9/04 356/497 |

(Continued)

FOREIGN PATENT DOCUMENTS

| | | |
|---|---|---|
| JP | 2001-066123 A | 3/2001 |
| JP | 3162355 B2 | 4/2001 |
| JP | 2012-117858 A | 6/2012 |

*Primary Examiner* — Michael A Lyons
(74) *Attorney, Agent, or Firm* — Foley & Lardner LLP

(57) ABSTRACT

A measurement apparatus includes a filter changing a light amount of an irradiation light, a lens irradiating a surface of a material with the irradiation light, a stage changing a focus position of the irradiation light in a depth direction of the material, an interfering light extractor causing the irradiation light to interfere with reflected light from the material, a detector detecting an intensity of interfering light obtained by interference between the irradiation light and the reflected light, and a controller calculating a height of the surface of the material based on the detected intensity of interfering light while changing a relative focus position of the irradiation light with respect to the material at a given measurement point of the surface of the material. The controller controls the filter or light source based on the detected intensity of interfering light to change the light amount of the irradiation light.

8 Claims, 7 Drawing Sheets

(56) References Cited

U.S. PATENT DOCUMENTS

| | | | |
|---|---|---|---|
| 9,234,814 B1* | 1/2016 | Novak | G01M 11/02 |
| 2007/0188768 A1* | 8/2007 | Mansfield | G01B 11/0675 |
| | | | 356/504 |
| 2008/0123103 A1* | 5/2008 | Fujii | G01B 11/2441 |
| | | | 356/496 |
| 2010/0097619 A1* | 4/2010 | Ge | G01M 11/0271 |
| | | | 356/511 |
| 2013/0208279 A1* | 8/2013 | Smith | G03F 7/70633 |
| | | | 356/401 |
| 2014/0362383 A1* | 12/2014 | Haitjema | G01J 1/02 |
| | | | 356/450 |
| 2018/0156597 A1* | 6/2018 | Smith | G01B 9/02035 |
| 2018/0252512 A1* | 9/2018 | Ohba | G01B 9/02012 |
| 2019/0049236 A1* | 2/2019 | Ohba | G01B 9/0209 |
| 2019/0113328 A1* | 4/2019 | Shen | G01B 9/02057 |

* cited by examiner

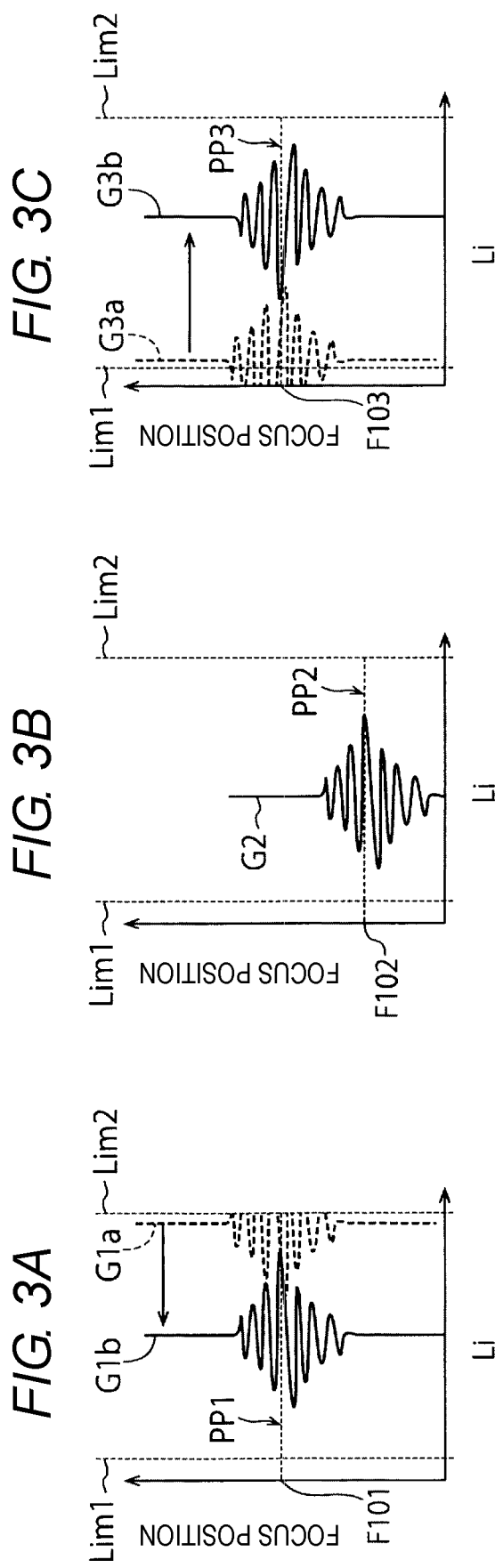

MEASUREMENT APPARATUS FOR MEASURING HEIGHT OR SHAPE OF A SURFACE OF A MATERIAL

CROSS-REFERENCE TO RELATED APPLICATION

This application claims the benefit of and priority to Japanese Patent Application No. 2018-038860, filed Mar. 5, 2018, the entire contents of which are incorporated herein by reference.

FIELD

Embodiments described herein relate generally to a measurement apparatus.

BACKGROUND

In semiconductor manufacturing processes, there is a demand for a technique to three-dimensionally image the shape of a pattern present on the surface of a semiconductor substrate and non-destructively measure the height or thickness of the pattern. As an instrument usable for such measurement, a measurement apparatus utilizing white color interference (hereinafter "white color interference measurement apparatus") is being conceived.

However, in semiconductor manufacturing patterns, a wide variety of material layers are formed on a semiconductor substrate, and various patterns are present on not only upper layers but also lower layers. In such a situation, reflectance greatly differs depending on the coverage factor or the quality of material of each layer, and, in the case of attempting to perform measurement utilizing white color interference, interference fringes of white color interference may become unable to be clearly captured with differences in brightness. This may reduce the accuracy of an image and thus impair the reliability of measurement.

DESCRIPTION OF THE DRAWINGS

FIG. 3A, FIG. 3B, and FIG. 3C are graphs each illustrating the intensity of interfering light detected by a camera.

DETAILED DESCRIPTION

Figure 1:
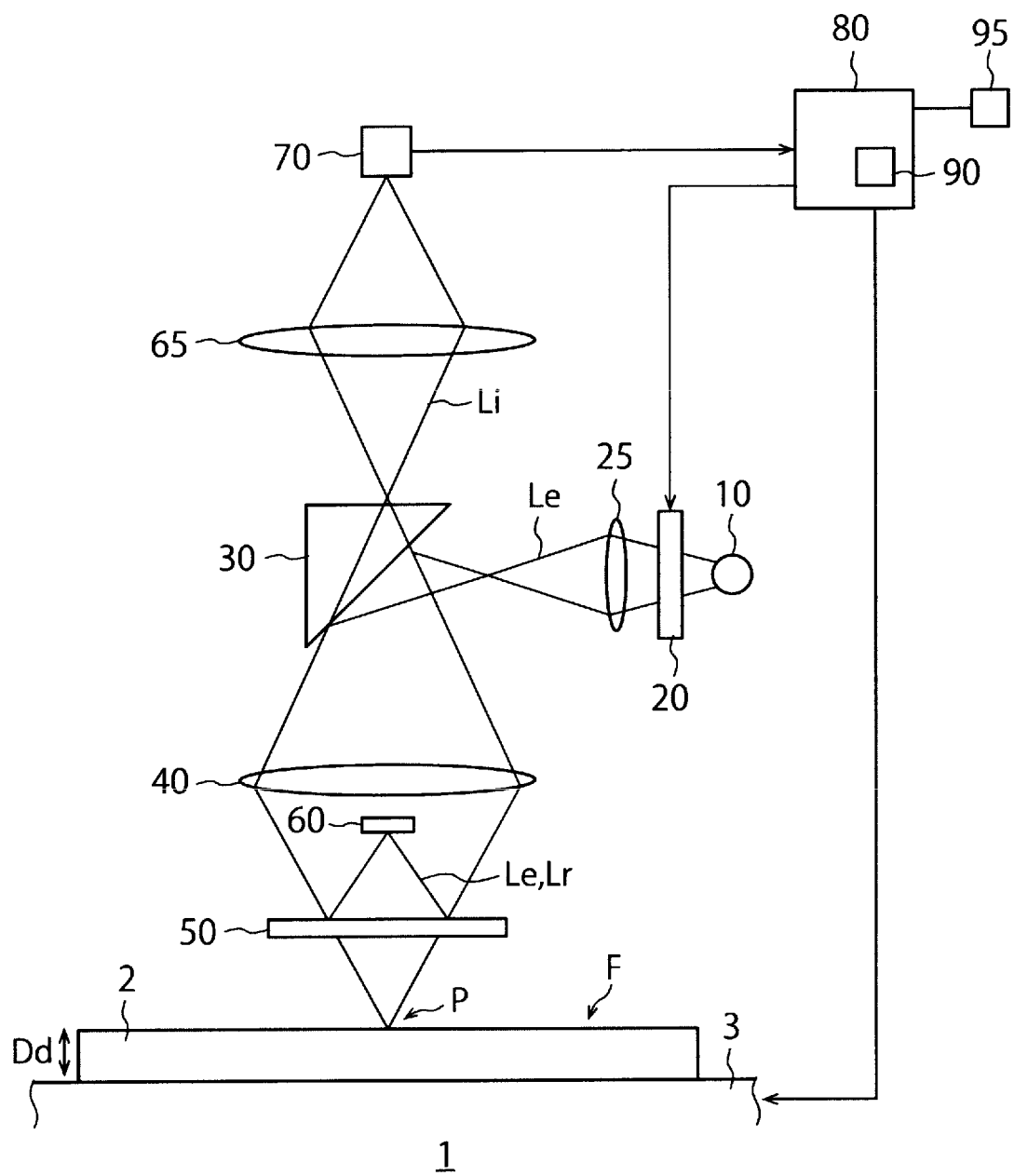
FIG. 1 is a view illustrating a configuration example of a measurement apparatus according to a first embodiment.

Embodiments provide a measurement apparatus capable of measuring the height or shape of a surface of a material with high accuracy.

According to some embodiments, a measurement apparatus may include a light source which emits irradiation light. A filter may change a light amount of the irradiation light. A lens mechanical unit may irradiate a surface of a material with the irradiation light. A focus position adjustment unit may change a focus position of the irradiation light in a depth direction of the material. An interference unit (i.e., interfering light extractor) may cause the irradiation light and reflected light from the material to interfere with each other. A detection unit may detect an intensity of interfering light obtained by interference between the irradiation light and the reflected light. A calculation control unit may calculate a height of the surface or an interface of the material based on the intensity of interfering light detected by the detection unit while changing a relative focus position of the irradiation light with respect to the material at a given measurement point of the surface of the material. The calculation control unit may control the filter or the light source based on the intensity of interfering light detected by the detection unit, thus changing the light amount of the irradiation light.

Hereinafter, embodiments according to the present disclosure will be described with reference to the drawings. These embodiments are not meant to limit the present disclosure. In the drawings, for example, the ratios of various portions are not necessarily the same as the actual ones. In the specification and the drawings, elements similar to those previously described with reference to the previously-mentioned drawings are assigned the respective same reference characters, and the detailed description thereof is not repeated as appropriate.

First Embodiment

FIG. 1 is a view illustrating a configuration example of a measurement apparatus 1 according to a first embodiment. The measurement apparatus 1 is, for example, a measurement apparatus which measures the height of a surface F of a material 2 utilizing interference of white color light. The measurement apparatus 1 generates a surface shape of the material 2 by joining, on a data basis, the heights of the surface of the material 2 at a plurality of measurement points. The user can observe the surface shape of the material generated in this way on a data basis and determine whether the material is in an appropriately processed state. The measurement apparatus 1 illustrated in FIG. 1 uses what is called a Mirau interferometer, but can be configured to use another type of interferometer, such as a Michelson interferometer.

The measurement apparatus 1 includes a stage 3, a light source 10, an optical filter 20, a lens 25, a beam splitter 30, an objective lens 40, a beam splitter 50, a reference mirror 60, a lens 65, a camera 70, a calculation control unit (or a controller) 80, memory (or storage unit or storage) 90, and a display unit (or display) 95.

The stage 3 may allow the material 2 to be mounted thereon. The stage 3 may be movable in the approximately vertical direction or in the approximately horizontal direction under the control of the calculation control unit 80. The calculation control unit 80 may be a processor (e.g., a central processing unit (CPU), a special purpose processor, logic circuitry that processes instructions). According to the movement of the stage 3, the focus position of the lens 40 can be relatively moved with respect to the material 2. The stage 3 may configure a focus position adjustment unit.

The light source 10 may generate irradiation light Le, with which to irradiate the material 2. The material 2 can be, for example, a semiconductor substrate or a material layer provided on a semiconductor substrate (for example, a silicon oxide film, a silicon nitride film, or a resist film). In the first embodiment, white color light may be used as an example of the irradiation light Le. However, the irradiation light Le can be, for example, ultraviolet (UV) light, deep UV (DUV) light, or infrared (IR) light. Furthermore, the use of white color interference with the irradiation light Le enables measuring the surface shape of a colorless and transparent material with high accuracy. Moreover, the use of white color interference with the irradiation light Le also enables performing measurement in a wide range at high speed.

The optical filter 20 may change the attenuation rate of the light amount of the irradiation light Le emitted from the light source 10, thus attenuating or increasing the light amount. The irradiation light Le having passed through the optical filter 20 may be guided via, for example, the lens 25 to irradiate the material 2. The optical filter 20 can change the attenuation rate of the light amount of the irradiation light Le under the control of the calculation control unit 80. Furthermore, to increase the light amount of the irradiation light Le, the light source 10 can increase the output power thereof.

The beam splitter 30 may reflect the irradiation light Le coming from the optical filter 20 toward the material 2. Moreover, the beam splitter 30 may guide the irradiation light Le to irradiate the material 2 therewith and allow reflected light Lr from the material 2 to pass therethrough toward the camera 70.

The objective lens 40 may guide the irradiation light Le coming from the beam splitter 30 to irradiate the material 2 therewith. More specifically, the irradiation light Le may be thrown in the approximately vertical direction upon the surface of the material 2. At this time, moving the stage 3 in the approximately vertical direction with respect to the surface of the material 2 may enable adjusting the position at which the irradiation light Le thrown from the objective lens 40 is focused in the material 2 (e.g., the focus position in the depth direction Dd). The objective lens 40 may configure a lens mechanical unit. The calculation control unit 80 can control the stage 3 to relatively change the focus position in the material 2 of the irradiation light Le thrown from the objective lens 40.

The beam splitter 50 may reflect a part of the irradiation light Le coming from the objective lens 40 toward the reference mirror 60 and allow the other part of the irradiation light Le to pass therethrough toward the material 2. Moreover, the beam splitter 50 may allow the reflected light Lr from the material 2 to pass therethrough toward the objective lens 40 and the reference mirror 60.

The reference mirror 60 may also reflect, toward the beam splitter 50, the part of the irradiation light Le reflected from the beam splitter 50. With this, the irradiation light Le may repeat reflection between the reference mirror 60 and the beam splitter 50. Accordingly, between the reference mirror 60 and the beam splitter 50, the irradiation light Le may interfere with the reflected light Lr from the material 2 having passed through the beam splitter 50. Thus, the beam splitter 50 and the reference mirror 60 may serve as an interfering light extractor which causes the irradiation light Le and the reflected light Lr to interfere with each other to thereby extract an interfering light Li.

The interfering light Li obtained by interference between the irradiation light Le and the reflected light Lr may pass through the interfering light extractor (e.g., the beam splitter 50 and the reference mirror 60) and may be then detected by the camera 70 after being guided thereto via the objective lens 40, the beam splitter 30, and the lens 65.

The camera 70, which serves as a detection unit or a detector, may detect the intensity (alternatively, the luminance or the light amount) of the interfering light Li obtained by interference between the irradiation light Le and the reflected light Lr while changing the focus position of the irradiation light Le in the depth direction Dd at a given measurement point P of the surface of the material 2. For example, the irradiation light Le may be focused at any position in the depth direction Dd of the material 2 by the objective lens 40. At this time, in a case where there is no quality variation of the material 2 in the vicinity of the focused position, or in a case where there is no surface or interface of the material 2, the irradiation light Le is not much reflected in the material 2. Accordingly, the light amount of the reflected light Lr is small, so that the variation of the interfering light Li due to a change of the focus position is small. In other words, in a case where the irradiation light Le is focused at a depth position where there is no surface or interface of the material 2, the intensity of the interfering light Li which is detected by the camera 70 does not have so large amplitude and does not have a peak as such. On the other hand, in a case where the quality of the material 2 varies in the vicinity of the focused position, or in a case where there is a surface or interface of the material 2, the irradiation light Le is reflected by the surface or interface of the material 2. Accordingly, the light amount of the reflected light Lr becomes relatively large, so that the variation of the interfering light Li due to a change of the focus position becomes large. In other words, in a case where the irradiation light Le is focused at a depth position where there is a surface or interface of the material 2, the intensity of the interfering light Li which is detected by the camera 70 has a large amplitude and has a large peak.

In this way, in an interface where the quality of the material 2 varies, the variation of the intensity of the interfering light Li becomes large. Therefore, the calculation control unit 80 can determine the height (or depth) position of a surface or interface of the material 2 based on the peak position of interference fringes of the interfering light Li. Furthermore, the interference fringes of the interfering light Li and the peak thereof are described below with reference to FIG. 2A to FIG. 3C.

The calculation control unit 80 may calculate the height of the surface of the material 2 based on the intensity of the interfering light Li detected by the camera 70. For example, the calculation control unit 80 may determine that, in the interference fringes of the interfering light Li, the peak position of the intensity of the interfering light Li is an interface or surface of the material 2. Moreover, the calculation control unit 80 may control an operation of the stage 3 and control the light attenuation rate of the optical filter 20.

The display unit 95 may display, for example, the intensity of the interfering light Li, the height of the surface of the material 2 calculated by the calculation control unit 80, and/or a two-dimensional shape or three-dimensional shape of the surface of the material 2.

Figure 2A:
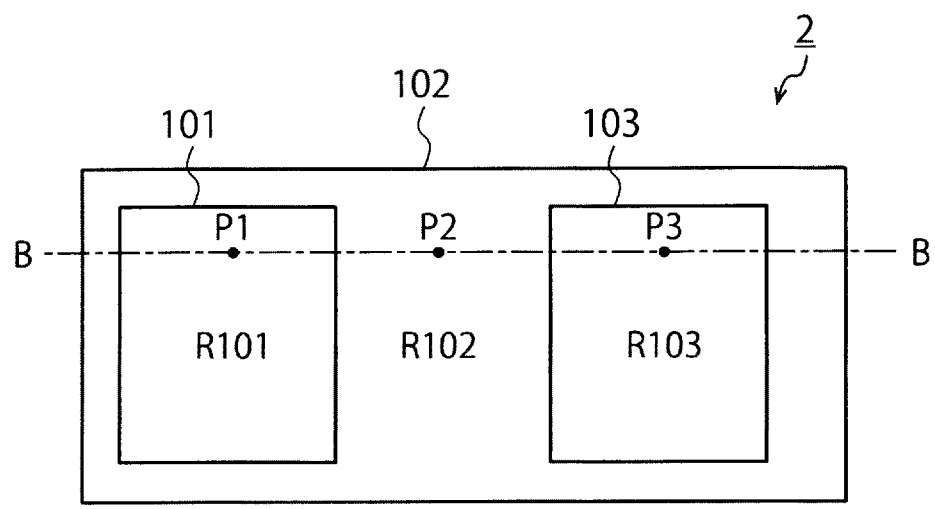
FIG. 2A, FIG. 2B, and FIG. 2C are a plan view and sectional views illustrating an example of a material.
Figure 2B:
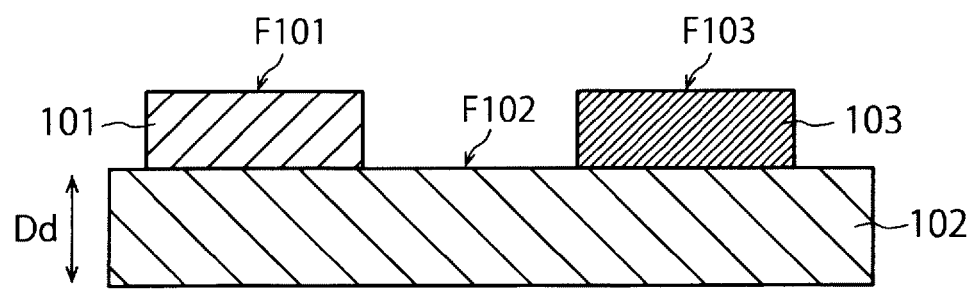
Figure 2C:

FIG. 2A and FIG. 2B are a plan view and a sectional view each illustrating an example of the material 2. The material 2 may include a metal film 101, a semiconductor substrate 102, and a silicon oxide film 103. The metal film 101 may be, for example, a high-reflectance film made from, for example, copper or tungsten. The semiconductor substrate 102 may be, for example, a silicon substrate. The reflectance may be highest in the metal film 101 and become lower in the semiconductor substrate 102 and the silicon oxide film 103 in that order. The metal film 101 and the silicon oxide film 103 may be provided on the semiconductor substrate 102.

The measurement apparatus 1 (see FIG. 1) may measure the intensity of the interfering light Li while changing the focus position in the depth direction Dd at measurement points P1 to P3 of the material 2. The focus position can be relatively changed with respect to the material 2 by moving the stage 3 with the material 2 mounted thereon in the depth direction Dd. The measurement point P1 is any point on the surface F101 of the metal film 101. The measurement point P2 is any point on the surface F102 of the semiconductor substrate 102. The measurement point P3 is any point on the surface F103 of the silicon oxide film 103. The measurement apparatus 1 may measure the height of the surface of each of the metal film 101 and the silicon oxide film 103 based on a result of measurement of the intensity of the interfering light Li. Measurement results of the intensity of the interfering light Li at the measurement points P1 to P3 are illustrated in FIG. 3A to FIG. 3C.

FIG. 3A to FIG. 3C are graphs each illustrating the intensity of the interfering light Li detected by the camera 70. FIG. 3A illustrates the intensity of the interfering light Li at the measurement point P1. FIG. 3B illustrates the intensity of the interfering light Li at the measurement point P2. FIG. 3C illustrates the intensity of the interfering light Li at the measurement point P3. Moreover, the horizontal axis indicates the intensity of the interfering light Li. The vertical axis indicates the focus position of the irradiation light Le in the depth direction Dd. Lim1 denotes the lower limit light intensity which is detectable by the camera 70. Lim2 denotes the upper limit light intensity which is detectable by the camera 70.

Referring to FIG. 3A to FIG. 3C, when the focus position of the irradiation light Le is in the vicinity of the surface of the metal film 101, the semiconductor substrate 102, or the silicon oxide film 103, the variation (or amplitude) of the intensity of the interfering light Li may become large. Accordingly, the calculation control unit 80 can determine that the peaks PP1 to PP3 of the intensity of the interfering light Li respectively correspond to the surfaces of the metal film 101, the semiconductor substrate 102, and the silicon oxide film 103. Furthermore, each of the peaks PP1 to PP3 may be a position at which the intensity of the interfering light Li becomes maximum as a result of the irradiation light Le and the reflected light Lr strengthening each other or a position at which the intensity of the interfering light Li becomes minimum as a result of the irradiation light Le and the reflected light Lr weakening each other.

However, at the measurement point P1, which is present on the metal film 101 having a high reflectance, the intensity of the reflected light Lr may be, therefore, high as a whole. Accordingly, actually, as indicated by a dashed-line graph G1a illustrated in FIG. 3A, the intensity (or luminance) of the interfering light Li may be lopsided to the vicinity of the upper limit Lim2. Thus, the mean intensity (or the light intensity of the base (i.e., background)) of the interfering light Li is close to the upper limit Lim2, so that the peak of the intensity of the interfering light Li may exceed the upper limit Lim2. In this case, it may become difficult for the calculation control unit 80 to recognize the peak of the intensity of the interfering light Li.

Moreover, at the measurement point P3, which is present on the silicon oxide film 103 having a relatively low reflectance, the intensity of the reflected light Lr may be, therefore, low as a whole. Accordingly, actually, as indicated by a dashed-line graph G3a illustrated in FIG. 3C, the intensity (or luminance) of the interfering light Li may be lopsided to the vicinity of the lower limit Lim1. Thus, the mean intensity (or the light intensity of the base (i.e., background)) of the interfering light Li may be close to the lower limit Lim1, so that the peak of the intensity of the interfering light Li may fall below the lower limit Lim1. In this case, it may become difficult for the calculation control unit 80 to recognize the peak of the intensity of the interfering light Li.

As mentioned above, the mean intensity of the interfering light Li may greatly vary depending on a difference in reflectance of the material 2. In this case, it may become difficult for the calculation control unit 80 to accurately recognize the peak of the intensity of the interfering light Li.

Therefore, the calculation control unit 80 according to the first embodiment may control the optical filter 20 or the light source 10 based on a previously-measured intensity of the interfering light Li, thus changing the light amount of the irradiation light Le. For example, the calculation control unit 80 may previously measure the mean intensities of the interfering light Li at the measurement points P1 to P3 and then control the optical filter 20 or the light source 10 in such a way as to bring the mean intensities close to each other. More desirably, the calculation control unit 80 may control the optical filter 20 or the light source 10 in such a way as to bring the intensities of the interfering light Li at the measurement points P1 to P3 approximately equal to each other.

For example, as illustrated in FIG. 3A, the optical filter 20 may attenuate the light amount of the irradiation light Le in such a way as to translate the dotted-line graph G1a to a solid-line graph G1b. Moreover, as illustrated in FIG. 3C, the optical filter 20 may restore (or increase) the attenuated light amount of the irradiation light Le in such a way as to translate the dotted-line graph G3a to a solid-line graph G3b. In a case where the optical filter 20 cannot increase the light amount of the irradiation light Le any more, the power output of the light source 10 can be increased, so that the light source 10 can increase the light amount of the irradiation light Le. With this, the mean intensities indicated by the graphs G1b and G3b (see FIG. 3A and FIG. 3C) come close to the mean intensity indicated by a graph G2 (see FIG. 3B), so that the mean intensities indicated by the graphs G1b, G2, and G3b become approximately equal to each other. Moreover, the graphs G1b, G2, and G3b can be brought into a range between the lower limit Lim1 and the upper limit Lim2. With this, even if there is a difference in reflectance of the material 2, the calculation control unit 80 can accurately recognize the peak of the intensity of the interfering light Li. Furthermore, the calculation control unit 80 can change the light amount of the irradiation light Le using the intensity of the base (i.e., background) of the interfering light Li instead of the mean intensity of the interfering light Li.

The camera 70 may send a result of detection of the interfering light Li to the calculation control unit 80. The calculation control unit 80 can recognize the peaks PP1 to PP3 based on the Graphs G1b, G2, and G3b, respectively. Each of the peaks PP1 to PP3 is a point of the interfering light Li having the largest amplitude from the mean intensity (alternatively, the intensities of the base (i.e., background)) of the interfering light Li. Moreover, the calculation control unit 80 may determine that the focus positions corresponding to the peaks PP1 to PP3 are the height positions of the surfaces or interfaces of the metal film 101, the semiconductor substrate 102, and the silicon oxide film 103, respectively. Height data about the surfaces or interfaces of the metal film 101, the semiconductor substrate 102, and the silicon oxide film 103 may be then stored in the memory 90. Furthermore, the height of a surface or interface can be a height that is based on any given depth position. For example, the height of a surface or interface can be represented by a height that is based on the surface of the stage 3. Alternatively, the surface of the material 2 at a point with which measurement is started can be used as a benchmark, and, in a case where the material 2 is a semiconductor chip, the surface of the semiconductor substrate 102 can be used as a benchmark.

The measurement apparatus 1 can also repeat measurement at positions other than the measurement points P1 to P3. For example, the measurement apparatus 1 may similarly perform height measurement at many measurement points along line B-B in FIG. 2A. These results of measurement may be then stored in the memory 90. The calculation control unit 80 can array and join (or combine) heights measured at a plurality of measurement points on a data basis. With this, assuming that the material 2 has such a shape of the surface or interface as illustrated in FIG. 2B, the measurement apparatus 1 can generate a reproductive shape SH such as that illustrated in FIG. 2C. The reproductive shape SH may be obtained as a two-dimensional shape corresponding to the surface or interface of the material 2 along line B-B.

Furthermore, the measurement apparatus 1 may also similarly perform measurement at regions other than the region indicated by line B-B in FIG. 2A, thus being able to non-destructively generate a two-dimensional shape with respect to the entirety of the surface or interface of the material 2. The calculation control unit 80 may array and join (or combine) a plurality of two-dimensional shapes of the surface or interface of the material 2 on a data basis, thus being able to non-destructively generate a three-dimensional shape of the surface of the material 2. The two-dimensional shape or three-dimensional shape of the surface of the material 2 can be displayed on the display unit 95. This enables the user to easily recognize the surface shape of the material 2.

Next, an operation of the measurement apparatus 1 according to the first embodiment is described.

Figure 4:
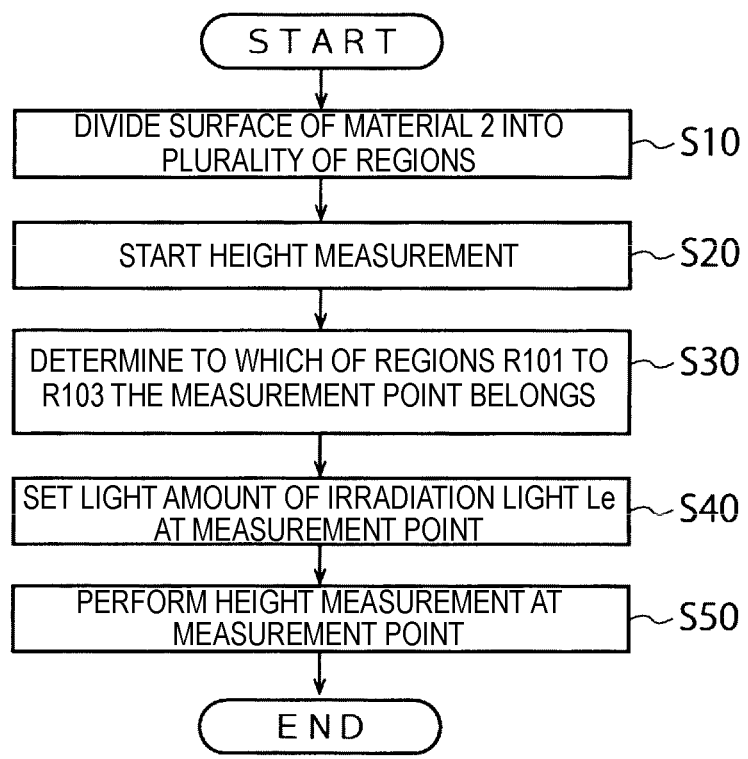
FIG. 4 is a flowchart illustrating an example of an operation of the measurement apparatus according to the first embodiment.

FIG. 4 is a flowchart illustrating an example of an operation of the measurement apparatus 1 according to the first embodiment.

First, in step S10, the measurement apparatus 1 may capture an image of the entire surface of the material 2 (or use a previously captured image of the entire surface of the material 2), and divide the surface of the material 2 into a plurality of regions based on its luminance (or gray level). At this time, the calculation control unit 80 can automatically perform region division for each range of luminance previously set by the user or manufacturer. For example, in FIG. 2A, a region R101 may belong to a first luminance range, a region R102 may belong to a second luminance range, and a region R103 may belong to a third luminance range. In this case, as illustrated in FIG. 2A, the calculation control unit 80 may perform division into three regions, i.e., the region R101 of the metal film 101, the region R103 of the silicon oxide film 103, and the other region, i.e., the region R102 of the semiconductor substrate 102, based on the luminance of the material 2. Each range of luminance may be previously stored in the memory 90 while being associated with the light amount of the irradiation light Le corresponding thereto. Moreover, for example, position information (e.g., coordinates) about the regions R101 to R103 obtained by division in step S10 may be also stored in the memory 90.

Next, in step S20, the measurement apparatus 1 may start height measurement of the surface of the material 2. In step S30, the calculation control unit 80 may determine to which of the regions R101 to R103 stored in the memory 90 the measurement point belongs.

Next, in step S40, the calculation control unit 80 may specify a light amount corresponding to the region to which the measurement point belongs, and set the light amount of the irradiation light Le coming from the optical filter 20 or the light source 10 in such way as to become equal to the specified light amount. With this, the calculation control unit 80 can set the light amount of the irradiation light Le for each of the regions R101 to R103 based on the luminance. For example, with regard to the region R101 of the metal film 101, in which the luminance is high or the reflectance is high, the light amount of the irradiation light Le used at the time of measurement may be, therefore, previously set to a small value. With regard to the region R103 of the silicon oxide film 103, in which the luminance is low or the reflectance is low, the light amount of the irradiation light Le used at the time of measurement may be, therefore, previously set to a large value. With regard to the region R102 of the semiconductor substrate 102, in which the luminance is medium or the reflectance is medium, the light amount of the irradiation light Le used at the time of measurement may be, therefore, previously set to an intermediate value between the light amount of the irradiation light Le for the metal film 101 and the light amount of the irradiation light Le for the silicon oxide film 103.

Next, in step S50, the measurement apparatus 1 may perform height measurement of the surface of the material 2 using white color interference at each measurement point. With this, as in the graphs G1$b$, G2, and G3$b$ illustrated in FIG. 3A to FIG. 3C, the measurement apparatus 1 can automatically set the light amount of the irradiation light Le according to the luminance of each region of the material 2, thus bringing the mean intensities of the interfering light Li in the respective regions of the material 2 close to each other or approximately equal to each other. As a result, the measurement apparatus 1 can measure the height or shape of the surface of the material 2 with high accuracy.

In the first embodiment, the calculation control unit 80 may measure the luminance of the surface of the material 2 and then automatically divide the region of the surface of the material 2 according to luminance differences. In some embodiments, the user can refer to and determine the luminance of the material 2 and the calculation control unit 80 may optionally divide the surface of the material 2 into a plurality of regions based on input from the user. In some embodiments, the calculation control unit 80 may allow the user to optionally change or adjust the regions obtained by the calculation control unit 80 automatically performing division.

Moreover, in the first embodiment, the measurement apparatus 1 may change the light amount of the irradiation light Le for each region and detect the intensity of the interfering light Li. However, the measurement apparatus 1 can change, for example, the focus, polarization, or wavelength of the irradiation light Le for each region, instead of the light amount of the irradiation light Le or in addition thereto. For example, the measurement apparatus 1 can change the focus of the irradiation light Le for each of the regions R101 to R103, thus also changing the mean intensity of the interfering light Li to some extent.

As described above, according to the first embodiment, the calculation control unit 80 may control the optical filter 20 or the light source 10 based on the intensity of the interfering light Li, thus changing the light amount of the irradiation light Le. With this, the measurement apparatus 1 can bring the mean intensities (alternatively, the intensities of the base (i.e., background)) of the interfering light Li at a plurality of measurement points P1 to P3 close to each other. As a result, the calculation control unit 80 can easily recognize the peaks PP1 to PP3 of the intensity of the interfering light Li, and thus can determine the height position of the surface or interface of the material 2 with ease and with high accuracy. When combining the height positions at a great number of measurement points of the material 2, the measurement apparatus 1 can non-destructively generate a two-dimensional shape or three-dimensional shape of the surface or interface of the material 2 with high accuracy.

Second Embodiment

Figure 5A:
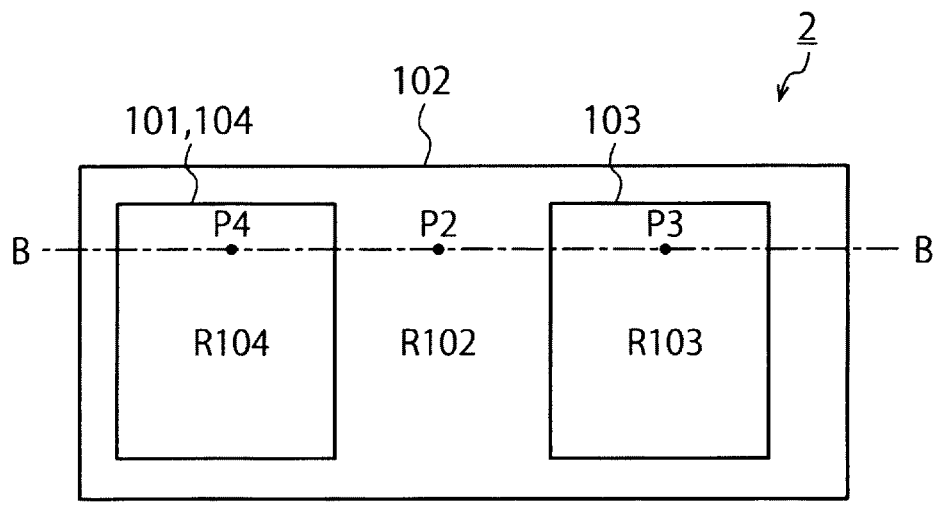
FIG. 5A and FIG. 5B are a plan view and a sectional view illustrating an example of a material according to a second embodiment.
Figure 5B:
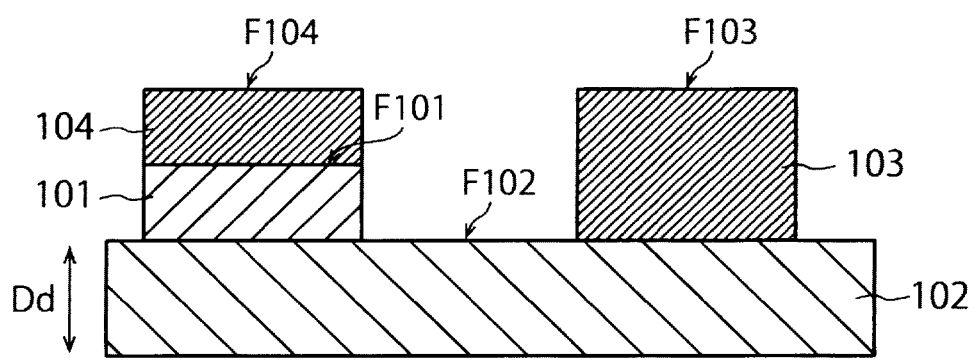

FIG. 5A and FIG. 5B are respectively a plan view and a sectional view each illustrating an example of a material 2 according to a second embodiment. In the second embodiment, the material 2 further includes a silicon oxide film 104 provided on the metal film 101. Thus, in a region R104, a stacked film configured with the metal film 101, which serves as a first material, and the silicon oxide film 104, which serves as a second material, may be provided on the semiconductor substrate 102. Hereinafter, the stacked film configured with the metal film 101 and the silicon oxide film 104 is referred to as a "stacked film 101, 104". Furthermore, the semiconductor substrate 102 and the silicon oxide film 103 can be similar to those in the first embodiment.

Figure 6C:
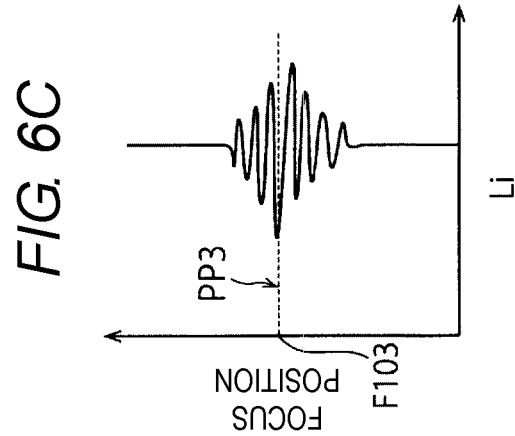
FIG. 6A, FIG. 6B, and FIG. 6C are graphs each illustrating the intensity of interfering light.
Figure 6B:
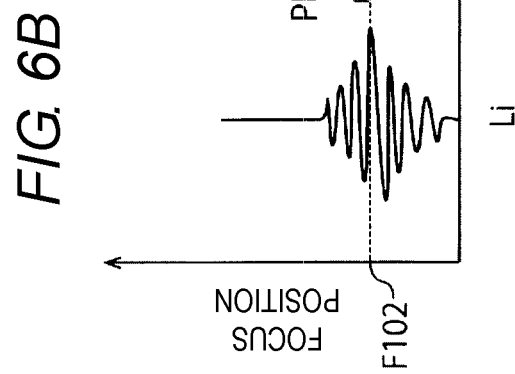
Figure 6A:
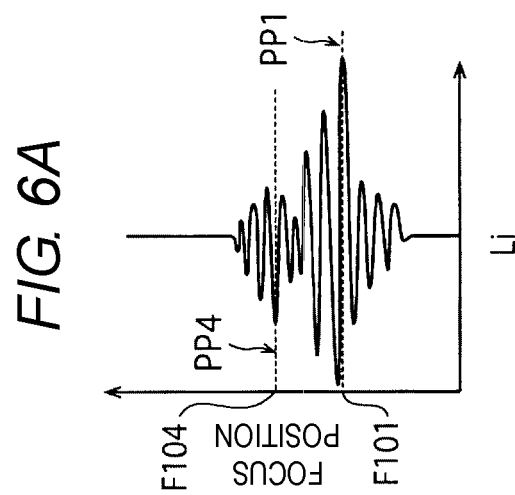

FIG. 6A to FIG. 6C are graphs each illustrating the intensity of the interfering light Li. FIG. 6A illustrates the intensity of the interfering light Li of the stacked film 101, 104 at a measurement point P4 illustrated in FIG. 5A. FIG. 6B illustrates the intensity of the interfering light Li of the semiconductor substrate 102 at a measurement point P2 illustrated in FIG. 5A. FIG. 6C illustrates the intensity of the interfering light Li of the silicon oxide film 103 at a measurement point P3 illustrated in FIG. 5A. The horizontal axis and the vertical axis are similar to those illustrated in FIG. 3. Moreover, the light amount of the irradiation light Le may be already corrected with use of the method described in the first embodiment. Accordingly, the mean intensities (or the intensities of the base (i.e., background)) of the interfering light Li at the measurement points P2 to P4 are assumed to be approximately equal to each other.

However, when the measurement apparatus 1 measures the interfering light Li derived from the stacked film 101, 104, a plurality of peaks PP1 and PP4 appears in proximity to each other as illustrated in FIG. 6A. The peak PP1 represents the maximum amplitude (or the minimum amplitude) of the interfering light Li at an interface between the metal film 101 and the silicon oxide film 104, i.e., at the interface F101 illustrated in FIG. 5B. The peak PP4 represents the minimum amplitude (or the maximum amplitude) of the interfering light Li at the surface of the silicon oxide film 104, i.e., at the surface F104 illustrated in FIG. 5B.

The reflectance of the metal film 101 may be higher than that of the silicon oxide film 104. Accordingly, the amplitude of the interfering light Li obtained from the metal film 101, which is a lower layer, may become larger than the amplitude of the interfering light Li obtained from the silicon oxide film 104, which is an upper layer.

Accordingly, when a plurality of peaks PP1 and PP4 appears in proximity to each other as illustrated in FIG. 6A, the influence of the peak PP1 at the interface between the metal film 101 and the silicon oxide film 104 may make it difficult for the calculation control unit 80 to recognize the peak PP4, which corresponds to the surface F104 of the silicon oxide film 104. Alternatively, the calculation control unit 80 may erroneously recognize the interface between the metal film 101 and the silicon oxide film 104 as the surface F104 of the silicon oxide film 104.

Figure 7:
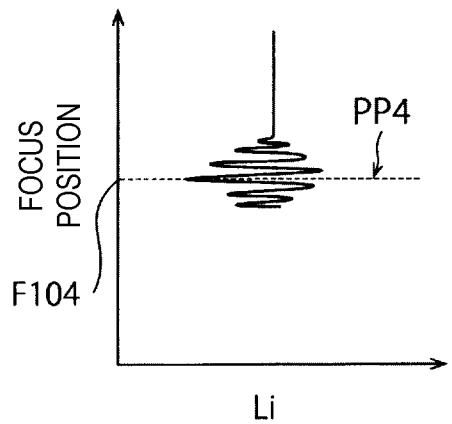
FIG. 7 is a graph illustrating an example of an operation of the measurement apparatus according to the second embodiment.

Therefore, in the measurement apparatus 1 according to the second embodiment, in a case where the intensity of the interfering light Li includes a plurality of peaks PP1 and PP4, the camera 70 may omit detecting the intensity of the interfering light Li at the focus position corresponding to one of the peaks. For example, FIG. 7 is a graph illustrating an example of an operation of the measurement apparatus 1 according to the second embodiment. In the second embodiment, the camera 70 may detect the intensity of the interfering light Li at the focus position corresponding to the peak PP4, which is one of the plurality of peaks PP1 and PP4, but omit detecting the intensity of the interfering light Li at the focus position corresponding to the peak PP1, which is the other peak. With this, the calculation control unit 80 may remove the influence of the peak PP1 occurring at the interface between the metal film 101 and the silicon oxide film 104, thus being able to readily and accurately recognize the peak PP4 corresponding to the surface F104 of the silicon oxide film 104.

Figure 8:
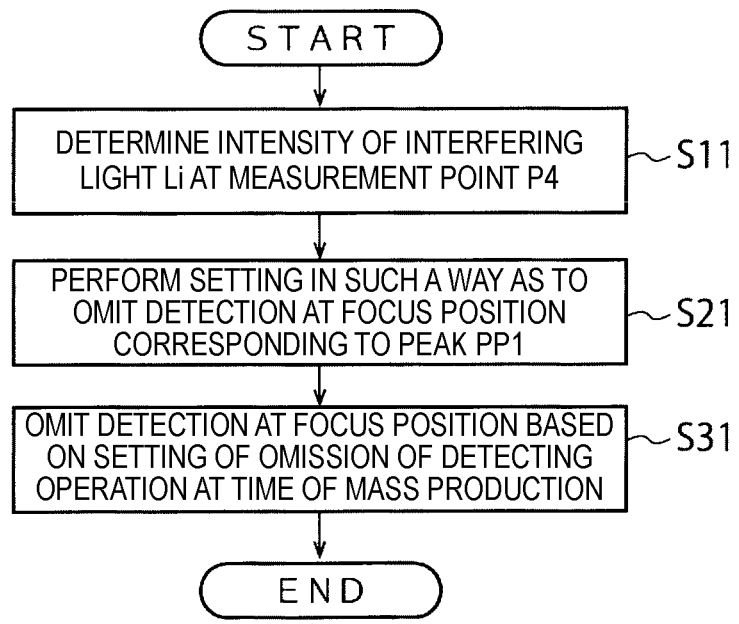
FIG. 8 is a flowchart illustrating an example of an operation of the measurement apparatus according to the second embodiment.

FIG. 8 is a flowchart illustrating an example of an operation of the measurement apparatus 1 according to the second embodiment.

First, in step S11, to selectively omit detecting the intensity of the interfering light Li at the focus position corresponding to the peak PP1, the measurement apparatus 1 may measure the intensity of the interfering light Li at the measurement point P4 at the time of test production. Next, in step S21, the user may set the measurement apparatus 1 in such way as to omit detection at the focus position corresponding to the peak PP1. This setting of omission can be previously stored in the memory 90. After that, in step S31, at the time of mass production, the measurement apparatus 1 may automatically omit detection at the focus position based on the setting of omission of the detecting operation. With this, at the time of mass production, the calculation control unit 80 can readily and accurately recognize the peak PP4 corresponding to the surface F104 of the silicon oxide film 104, while removing the influence of the peak PP1 occurring at the interface between the metal film 101 and the silicon oxide film 104.

While, in the above-described example, the stacked film 101, 104 includes two layers, the stacked film can be a stacked film configured with three or more layers. Moreover, in the above-described example, the focus position at which the detecting operation is omitted is set by the user. However, the focus position at which the detecting operation is omitted can be automatically set by the measurement apparatus 1 with use of, for example, design information about the material 2. In a case where the material 2 is a semiconductor chip, for example, the design information about the material 2 includes the position, thickness, and quality of each stacked film and the number of films of the stacked film. The calculation control unit 80 can recognize the design information about the material 2 and obtain, based on the design information, a rough correspondence relationship between the height of the interface or surface of the stacked film and the peak of the intensity of the interfering light Li.

On the basis of the thus-obtained correspondence relationship between the interface or surface of the stacked film and the peak of the intensity of the interfering light Li, the calculation control unit 80 can omit measurement of a focus position other than the focus position corresponding to the peak of the surface of the stacked film targeted for measurement. With this, the measurement apparatus 1 can readily and accurately recognize the peak PP4 corresponding to the surface F104 of the stacked film 101, 104 while removing the influence of the lower layer of the stacked film 101, 104. In a case where only a stacked film at the uppermost layer is targeted for measurement, to reduce the amount of calculation, the calculation control unit 80 can be configured to recognize, for example, only the position, thickness, and quality concerning the stacked film at the uppermost layer as the design information about the material 2.

Moreover, in a case where directions of patterns (for example, wiring directions) differ between the upper layer and lower layer of the stacked film 101, 104, the calculation control unit 80 can change the polarization of the irradiation light Le according to the directions of patterns of the upper layer and lower layer of the stacked film 101, 104.

At least a part of the measurement method in the measurement apparatus 1 according to the first and second embodiments can be configured with hardware or can be configured with software. In a case where it is configured with software, a program for implementing at least a part of functions of the measurement method can be stored in a recording medium, such as a flexible disc or a compact disc read-only memory (CD-ROM), and can be caused to be read in and executed by a computer. The recording medium is not limited to a detachable medium, such as a magnetic disc or an optical disc, but can be a fixed mount type recording medium, such as a hard disk drive or memory. Moreover, a program for implementing at least a part of functions of the measurement method can be distributed via a communication line (including wireless communication) such as the Internet. Furthermore, the program after being encrypted, modulated, or compressed can be distributed via a wired line or wireless line of, for example, the Internet or in a state of being stored in a recording medium.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A measurement apparatus comprising:
   a light source configured to emit an irradiation light, a light emission amount of the irradiation light being changeable;
   a filter configured to change a light pass amount of the irradiation light;
   a lens configured to irradiate a surface of a material with the irradiation light, the material including a first layer and a second layer via an interface;
   a stage configured to change a focus position of the irradiation light in the surface or the interface of the material in a plane direction and in a depth direction of the material;
   an interfering light extractor, having a beam splitter and a mirror, configured to cause the irradiation light and reflected light from the material to interfere with each other;
   a detector configured to detect an intensity of interfering light obtained by interference between the irradiation light and the reflected light, the detector having a lower detectable limit and an upper detectable limit; and
   a controller configured to calculate a height of the surface or the interface of the material based on the intensity of interfering light detected by the detector while changing a relative focus position of the irradiation light with respect to the material at a given measurement point of the surface of the material in the plane direction and in the depth direction,
   wherein
   the controller performs
     a plurality of first measurements along a first detection line in the plane direction while causing the stage to bring the focus position of the irradiation light to coincide with the surface of the material, and
     a plurality of second measurements along a second detection line in the plane direction while causing the stage to bring the focus position of the irradiation light to coincide with the interface of the material, and
   in each of the first measurements and in each of the second measurements,
     if the intensity of interfering light detected by the detector exceeds the upper detectable limit, the controller controls the filter to decrease the light pass amount or control the light source to decrease the light emission amount, and
     if the intensity of interfering light detected by the detector is smaller than the lower detectable limit, the controller controls the filter to increase the light pass amount or control the light source to increase the light emission amount.

2. The measurement apparatus according to claim 1, wherein the controller controls the filter or the light source to bring mean intensities of the interfering light at respective measurement points of the material close to each other.

3. The measurement apparatus according to claim 1, wherein the controller controls the filter or the light source to bring mean intensities of the interfering light at respective measurement points of the material approximately equal to each other.

4. The measurement apparatus according to claim 3, further comprising a storage configured to store heights of the surface or the interface of the material calculated by the controller at a plurality of measurement points of the material, wherein the controller generates a shape of the surface or the interface of the material based on the heights of the surface or the interface of the material.

5. The measurement apparatus according to claim 4, wherein the controller generates a two-dimensional shape of the surface or the interface of the material based on the heights of the surface or the interface of the material, and further generates a three-dimensional shape of the surface of the material based on a plurality of the two-dimensional shapes.

6. The measurement apparatus according to claim 4, further comprising a display configured to display the shape of the surface or the interface of the material generated by the controller.

7. The measurement apparatus according to claim 1, wherein the irradiation light is white color light.

8. The measurement apparatus according to claim 1, wherein the controller determines that the focus position obtained when a peak occurs in the intensity of the interfering light is a position corresponding to the surface or the interface of the material.

\* \* \* \* \*